(12) United States Patent
Le Faucheur

(10) Patent No.: US 9,812,115 B2
(45) Date of Patent: Nov. 7, 2017

(54) ACTIVE NOISE-CANCELLATION FEEDBACK SIGNAL TRANSMISSION

(71) Applicant: TEXAS INSTRUMENTS INCORPORATED, Dallas, TX (US)

(72) Inventor: Laurent Le Faucheur, Antibes—Juan-les-Pins (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/174,249

(22) Filed: Jun. 6, 2016

(65) Prior Publication Data

US 2016/0284335 A1    Sep. 29, 2016

Related U.S. Application Data

(62) Division of application No. 13/348,593, filed on Jan. 11, 2012, now Pat. No. 9,384,726.

(30) Foreign Application Priority Data

Jan. 6, 2012  (EP) .................................... 12290006

(51) Int. Cl.

| | | |
|---|---|---|
| *G10K 11/16* | (2006.01) | |
| *G10K 11/178* | (2006.01) | |
| *H04R 1/10* | (2006.01) | |
| *G06F 3/16* | (2006.01) | |
| *H04R 3/04* | (2006.01) | |
| *H04B 1/16* | (2006.01) | |
| *H04S 3/00* | (2006.01) | |
| *H04R 3/00* | (2006.01) | |

(52) U.S. Cl.
CPC ............ *G10K 11/178* (2013.01); *G06F 3/165* (2013.01); *G10K 11/1784* (2013.01); *H04R 1/1083* (2013.01); *H04R 3/04* (2013.01); *H04B 1/1684* (2013.01); *H04R 3/005* (2013.01); *H04S 3/004* (2013.01)

(58) Field of Classification Search
CPC ........ H04R 1/1083; H04R 3/04; H04R 3/005; H04B 1/1684; H04S 3/004; G10K 11/178; G10K 11/1788; G10K 11/1784; G06F 3/165
USPC .................................. 381/22, 23, 71.6, 71.2
See application file for complete search history.

(56) References Cited

U.S. PATENT DOCUMENTS 5,251,263 A  * 10/1993 Andrea .............. G10K 11/1784
                                                381/71.6
9,672,805 B2 *  6/2017 Kim ..................... G10K 11/178
(Continued)

*Primary Examiner* — William A Jerez Lora
(74) *Attorney, Agent, or Firm* — Lawrence J. Bassuk; Charles A. Brill; Frank D. Cimino

(57) ABSTRACT

A noise-cancelling system includes headset for generating a feedback signal for noise-cancellation in response to sound externally generated from the headset. An encoded microphone signal is generated in response to the first feedback signal. An audio generator can be used to generate a noise-cancellation signal in response to the encoded microphone signal and to generate an electronic audio signal in response to the encoded microphone signal and a first output audio signal. An audio connector is provided to couple the encoded microphone signal from the headset to the audio generator and to couple the first electronic audio signal to the headset.

6 Claims, 2 Drawing Sheets

(56) References Cited

U.S. PATENT DOCUMENTS

| | | | |
|---|---|---|---|
| 2005/0249355 A1* | 11/2005 | Chen | G10K 11/1784 381/71.14 |
| 2007/0242834 A1* | 10/2007 | Coutinho | G10K 11/1788 381/71.8 |
| 2008/0085679 A1* | 4/2008 | Fettig | H04B 5/06 455/41.2 |
| 2009/0170550 A1* | 7/2009 | Foley | G10K 11/1788 455/550.1 |
| 2010/0040249 A1* | 2/2010 | Lenhardt | H04R 25/502 381/316 |
| 2010/0105447 A1* | 4/2010 | Sibbald | G10K 11/1788 455/570 |
| 2010/0284525 A1* | 11/2010 | Sander | H04R 1/1091 379/93.06 |
| 2011/0002474 A1* | 1/2011 | Fuller | G10K 11/1782 381/71.6 |
| 2011/0235466 A1* | 9/2011 | Booij | H04B 11/00 367/135 |
| 2015/0125022 A1* | 5/2015 | Jacobs | H04R 3/005 381/355 |

* cited by examiner

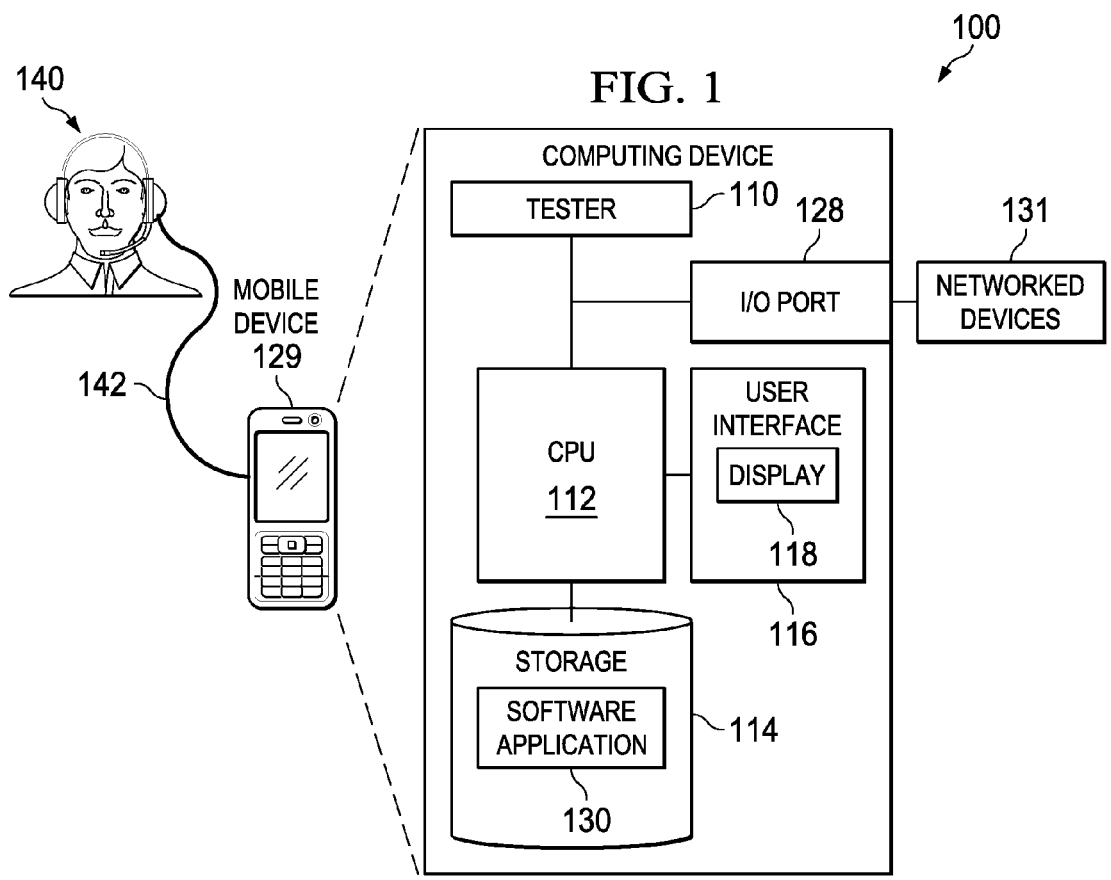
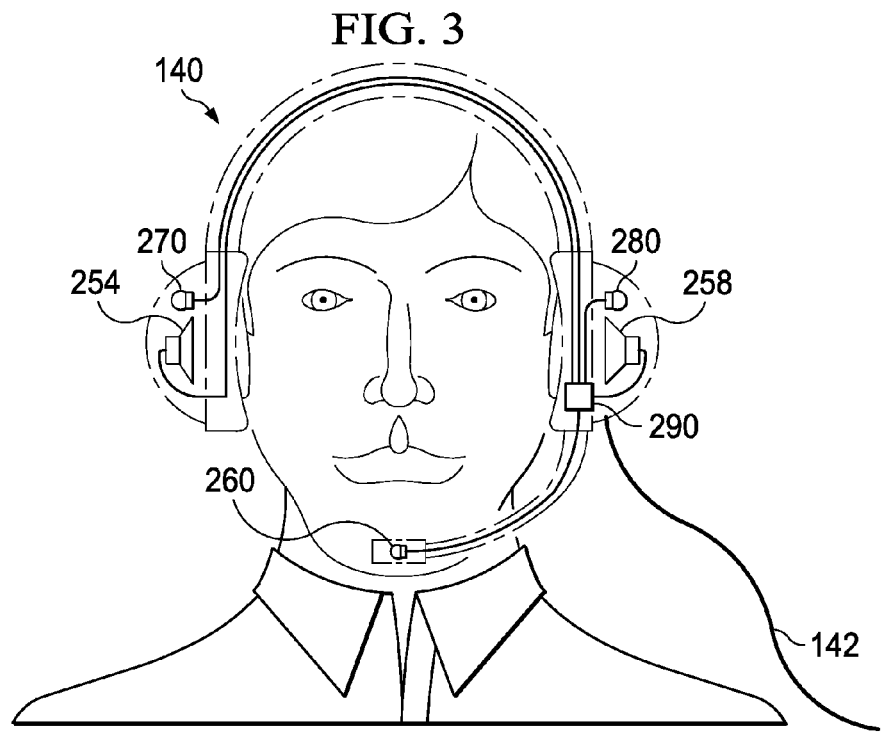

US 9,812,115 B2

ACTIVE NOISE-CANCELLATION FEEDBACK SIGNAL TRANSMISSION

This application is a divisional of prior application Ser. No. 13/348,593, filed Jan. 11, 2012, now U.S. Pat. No. 9,384,726, issued Jul. 5, 2016.

Which claims priority from European Patent Application No. 12290006.1, filed Jan. 6, 2012.

BACKGROUND

Electronic audio devices that are capable of producing and receiving electronic audio signals are arranged to couple the electronic audio signals to external audio devices such as recorders, players, amplifiers, microphones, and headsets. The audio input/output signals are often coupled to a headphone set (for example) using a standardized four-signal analog interface that uses, for example, contacts arranged co-axially in a tip-and-ring arrangement of a jack connector cabled to the headphone. The standardized four-signal analog interface for the electronic audio device includes a headset right sound output, a headset left sound output, a ground signal, and a microphone sound input. Each conductor in the headset jack is arranged to couple with an associated conductor (that corresponds in accordance with a location specified by the applicable standard) in a mating socket that is typically included in the electronic devices. Adapters are available so that jacks and sockets of differing sizes and arrangements can be successfully coupled together. Despite the conveniences provided by the standardized connectors, it is difficult to add functionality (such as noise cancellation as disclosed herein) to the electronic systems using the existing connectors for coupling external audio devices.

SUMMARY

The problems noted above are solved in large part by multiplexing noise-cancellation signals onto the microphone signal that is accommodated by conventional electronic audio devices. The noise-cancellation signals are generated by a microphone that is arranged to receive external sound (to be cancelled) at a location that is typically adjacent to a speaker to which the sound cancellation is to be applied. In stereo headsets, two microphones and two speakers are arranged in opposing portions of the headsets and multiplexed using differing portions of the microphone signal spectrum. The feedback microphones are arranged to generate feedback signals for noise-cancellation in response to sound externally generated from the headset. An encoder is arranged to generate an encoded microphone signal in response to the feedback signals and to transmit the encoded microphone signal to a demodulator of an external device that generates a sound signal that is to be received by the headset.

The noise-cancellation signal (or signals) is demultiplexed from the multiplexed microphone signal by demodulators of the external electronic device (such as portable cell phone) and provided as negative feedback in the audio output signal for driving the headset speaker that is adjacent to the microphone used to generate the associated noise-cancellation signal. The headset speaker is arranged to generate a sound wave directed towards a first ear of a user of the noise-cancelling headset in response to a first received electronic audio signal that is received from an external audio generator.

In an embodiment, an active noise-cancellation filter of the electronic audio device is used to remove the multiplexed noise-cancellation signals from the microphone signal.

In an embodiment, an ultrasonic portion of the spectrum is used to multiplex the noise-cancellation signals onto the microphone signal generated by a microphone of the headset, and ultrasonic demodulators are used to demultiplex the noise cancellation signals.

In yet another embodiment, the demodulation and summation is performed by digital signal processors present in the electronic audio device, and the multiplexing is performed by a headset of the electronic audio device.

BRIEF DESCRIPTION OF THE DRAWINGS

FIG. 1 shows an illustrative computing device 100 in accordance with embodiments of the disclosure.

FIG. 3 is a schematic diagram of a headset for an electronic audio device with noise cancellation in accordance with embodiments of the disclosure.

DETAILED DESCRIPTION

Figure 2:
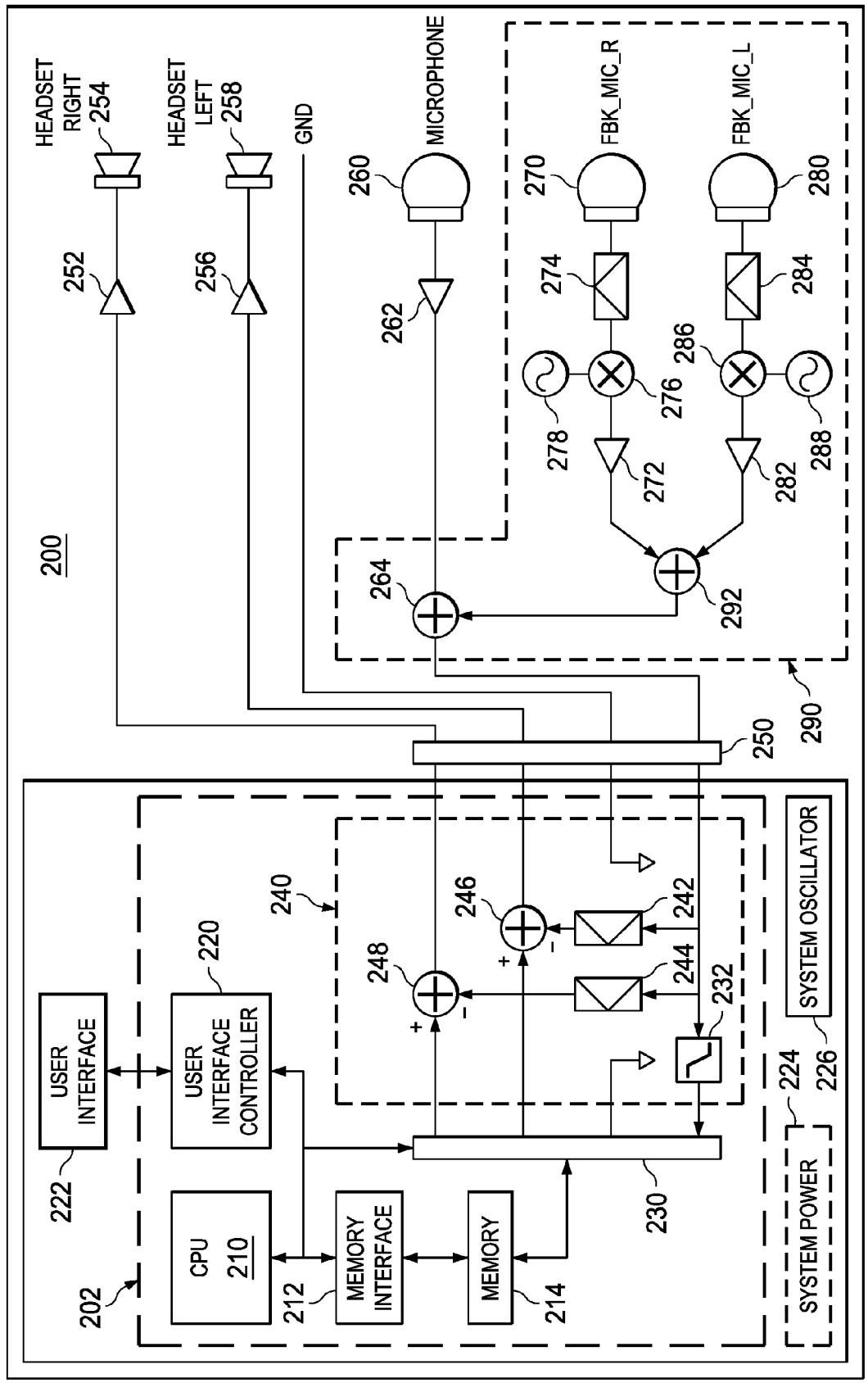
FIG. 2 is a schematic diagram illustrating an electronic audio device with noise cancellation in accordance with embodiments of the disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

FIG. 1 shows an illustrative computing device 100 in accordance with embodiments of the disclosure. For example, the computing device 100 is, or is incorporated into, a mobile device 129, such as a mobile phone, a personal digital assistant (e.g., a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as RAM, flash memory, or disk storage) stores one or more software applications 130 (e.g., embedded applications) that, when executed by the CPU 112, perform any suitable function associated with the computing device 100.

The tester 110 is a diagnostic system and comprises logic (embodied at least partially in hardware) that supports monitoring, testing, and debugging of the computing device 100 executing the software application 130. For example, the tester 110 can be used to emulate one or more defective or unavailable components of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio inputs (using, for example, voice recognition), and mechanical devices such as keypads, switches, proximity detectors, and the like. The CPU 112 and tester 110 is coupled to I/O (Input-Output) port 128, which provides an interface (that is configured to receive input from (and/or provide output to) peripherals and/or networked devices 131, including tangible media (such as flash memory) and/or cabled or wireless media (such as a Joint Test Action Group (JTAG) interface). These and other input and output devices are selectively coupled to the computing device 100 by external devices using wireless or cabled connections.

Mobile device 129 is an example computing device 100 that is used in various environments, including environments that include undesirable background noise that may compete with audio outputs of the mobile device 129. The mobile device 129 is capable of producing and receiving electronic audio signals that are coupled to external audio devices such as recorders, players, amplifiers, microphones, and headsets. Headsets 140 (that are coupled to the mobile device 129 through a headset cord 142) are often worn so as to increase the intelligibility and fidelity of sound that is generated from the electronic audio signals. Headset cord 142 is, for example, a cable that includes conductors arranged in accordance with a legacy analog interface or a legacy digital interface (such as the universal serial bus: USB).

As disclosed herein, headset 140 is arranged to provide active noise cancellation techniques by transmitting noise cancellation information (monaural or stereo) across a headset cord 142. As described below, the headset 140 includes electromechanical components (such as speakers and microphones) and a noise-cancellation signal generator for generating the noise-cancellation information. The noise-cancellation signal generator encodes the noise-cancellation signal information onto the microphone signal of the headset (irrespectively of whether the headset actually contains a speech microphone) and transmits the encoded noise-cancellation information across the headset cord 142 to the mobile device 129. The mobile device 129 is arranged to receive the noise-cancellation information encoded in the microphone signal, to decode the noise-cancellation information, to generate an electronic audio signal in response to the decoded noise-cancellation information, and to transmit the electronic audio signal across the headset cord 142 to the headset 140. The headset 140 optionally amplifies the received electronic audio signal and produces sound from the speakers in the headset 140.

Thus, the headset 140 does not process the electronic audio signal with the noise-cancellation information, which reduces the cost and power consumption of headset 140. Further, the headset cord 142 is at least extensible (e.g., "backwards-compatible") to permit the successful operation of legacy headsets (e.g., that use the standard four-connector audio plug). Use of the legacy headsets reduces costs of active noise-cancellation that would otherwise entail. The decoding of the noise-cancellation information and the generation of the electronic audio signal can be performed with little or no additional costs to the mobile device 129 by using components that are substantially available in the mobile device 129. Substantially available components are components that are normally (already) present in the mobile device 129 and/or components that do not increase the cost of the mobile device to measurably decrease sales of the mobile device 129 if the cost of the components were to be added to cost of the mobile device 129.

FIG. 2 is a schematic diagram illustrating an electronic audio device with noise cancellation in accordance with embodiments of the disclosure. Computing system 200 is illustrated as including a common substrate 202 upon which the illustrated elements of the computing system 200 are formed. Forming the illustrated elements of the computing system 200 on the common substrate 202 provides increased integration and reduces the number of connections for which drivers, bonding pads, and wiring would otherwise be used. In various embodiments, the included elements are implemented in separate circuit boards and assemblies. System power 224 is used to power both the elements of substrate 202 and the user interface 222 (such as a touch-screen and/or graphic display). System synchronization and clocking is provided by system oscillator 226.

The elements of substrate 202 typically include a CPU 210, a user interface controller 220, a system oscillator 230, a decoder 240, an oscillator 226, and system power 224. CPU 210 is a DSP, controller, microprocessor, or the like, and is used to control at least a portion of the processing of mobile device 129, for example. CPU 210 is typically coupled to a memory interface 212 that is arranged to control accesses to memory 214. The memory interface is additionally arranged to permit DMA ("direct memory accesses") of the memory 214 by subsystems such as the user interface controller 220 without intervention by the CPU 210. The memory 214 is arranged to store information used by audio subsystem 230 to control and provide content for audio playback and/or recording, for example, and information that is used for control and operational parameters for the noise-cancellation functions of decoder 240.

Audio system 230 is arranged to receive an input electronic audio signal and to output a stereo electronic audio signal via interface 250. Interface 250 is typically a conventional jack and socket pair that is arranged to transmit the input electronic audio signal and the output stereo audio signal. The interface 250 is arranged to couple the mobile device 129 to external, conventional headsets or headsets using active noise-cancellation feedback signal transmission as disclosed herein.

The user interface controller 220 is arranged to display information and receive commands from a user for controlling the mobile device 129 as well as the audio subsystem 230 and noise-cancellation functions such as those provided by decoder 240. For example, a user can use the user interface 222 to control the audio volume of a desired signal (e.g., media content) generated by audio subsystem 230. The user can also control the degree (if any) of noise-cancellation provided by decoder 240 by using the user interface 222 to adjust the magnitude of the inverting inputs (discussed below) of summing nodes 248 and 246 that provide negative feedback for noise cancellation. Information used to provide the negative feedback that is use for noise cancellation is captured and generated by encoder 290.

Encoder 290 is typically arranged in a headset to be used for noise-cancellation feedback signal transmission. Encoder 290 is arranged to generate an encoded noise-cancellation signal to be sent via interface 250 to the decoder 240. Noise-cancellation information for a first channel is encoded in a first portion of a noise-cancellation signal, while noise-cancellation information for a second channel is encoded in a second portion of the noise-cancellation signal. Various techniques for encoding and/or decoding such as time division or frequency division multiplexing can be used.

For example, encoder 290 includes a feedback microphone right (FBK_MIC_R) 270 and a feedback microphone left (FBK_MIC_L) 280 that are arranged sufficiently close to the corresponding headset right (HEADSET R) 254 or headset left (HEADSET L) 258 speaker. The feedback microphones 270 and 280 are arranged sufficiently close when the signals produced by the feedback microphones 270 and 280 are suitable for cancelling external sounds (e.g., not generated by a headset speaker) using negative feedback. The terms "left" and "right" are used to, for example, distinguish between the left and right signals and components, and are not necessarily used to describe an orientation with respect to the user of the headset 140 or an observer of the user of headset 140.

The outputs of the feedback microphones 270 and 280 are coupled to the inputs of baseband modulators 274 and 284 to produce modulation signals that are arranged to modulate an ultrasonic signal in response to the outputs of the feedback microphones 270 and 280. Signal generators 278 and 288 generate an ultrasonic carrier frequency to be modulated with a respective modulation signal. The signal generators 278 and 288 each output different ultrasonic frequencies so that modulation of opposing carrier signals does not result in overlap in sideband frequencies that cause acoustically apparent crosstalk between left and right channels.

The mixers 276 and 288 are arranged to receive a respective modulation signal and a carrier signal and in response generate a respective modulated output signal that ultrasonically encodes the noise-cancellation signals from the feedback microphones 270 and 280 into different ultrasonic frequency bands. The signals having different ultrasonic frequency bands are respectively conditioned by output amplifier 272 and 282 and are combined into a single signal at summing node 292. Thus, noise cancellation information from two channels is encoded a single noise cancellation signal.

In various embodiments, differing timing and frequency encoding techniques for the noise cancellation information can be used to multiplex the information such as separate frequency bands, interleaved sidebands, spread spectrum communication encoding techniques, and the like. Corresponding decoding techniques using as tuned demodulators, comb-filters, statistical analysis, and the like can be used to decode the encoded noise-cancellation information.

In embodiments where headsets using active noise-cancellation feedback signal transmission include a microphone 260 (and an optional amplifier 262), the noise cancellation signal is coupled to a first input of summing node 264 and an electronic audio signal from the microphone 260 is coupled to a second input of the summing node 264. Summing node 264 is arranged to add the ultrasonically encoded noise cancellation onto the electronic audio signal received from the microphone 260 to produce the encoded noise cancellation signal that is multiplexed onto the electronic audio signal from the microphone 260. The encoded noise cancellation signal that is multiplexed onto the electronic audio signal from the microphone 260 is coupled to the microphone input connector of the interface 250.

In embodiments where headsets using active noise-cancellation feedback signal transmission do not include a microphone 260, the noise cancellation signal can be more directly coupled to the microphone input connector of the interface 250 by not using an intervening summation node such as summing node 264.

The interface 250 is arranged to receive a ground (GND) shield/reference signal and the microphone signal, which includes the noise-cancellation information encoded as ultrasonic components. As discussed above, the interface 250 is mechanically arranged to receive a connector such as a jack from a headset with or without providing active noise-cancellation feedback signal transmission. The interface 250 is coupled to the decoder 240, which is coupled between the interface 250 and the audio subsystem 230.

Decoder 240 is arranged to decode the noise-cancellation information from the received encoded microphone signal. The noise-cancellation information is decoded by coupling the received encoded microphone signal to ultrasonic demodulators 244 and 242. Ultrasonic demodulator 244 is arranged to decode the encoded noise-cancellation information that is encoded in a first portion of the encoded microphone signal, while ultrasonic demodulator 242 is arranged to decode the encoded noise-cancellation information that is encoded in a second portion of the encoded microphone signal. For example, ultrasonic demodulator 244 generates a first demodulated signal in response to the noise-cancellation information that is carried in a first frequency portion, while ultrasonic demodulator 242 generates a second demodulated signal in response to the noise-cancellation information that is carried in a second frequency portion of the encoded microphone signal.

Decoder 240 is also arranged to remove the encoding artifacts in the encoded microphone signal by coupling the encoded microphone signal to low-pass filter 232, which (for example) removes ultrasonic components and passes the filtered microphone signal to the audio subsystem 230. The audio subsystem is arranged, for example, to transmit the filtered microphone signal as part of a cellular telephone conversation using the cellular telephone capabilities of the mobile device 129.

Decoder 240 is also arranged to generate an electronic audio signal (in mono or stereo) in response to the decoded noise-cancellation information, and to transmit the electronic audio signal across the interface 250 to the headset 140. For example, ultrasonic demodulator 244 is arranged to apply the first demodulated signal to an inverting input of summing node 248, while a right channel electronic audio output of the audio system 230 is applied to a non-inverting output of the summing node 248. Likewise, ultrasonic demodulator 242 is arranged to apply the second demodulated signal to an inverting input of summing node 246, while a left channel electronic audio output of the audio system 230 is applied to a non-inverting output of the summing node 246. Thus, the outputs of summing nodes 248 and 246 include sound cancellation information that is provided as negative feedback in the right and left channels of the electronic audio output signals applied to interface 250.

The right and left channels of the electronic audio output signals applied to interface 250 are coupled respectively to the amplifiers 252 and 256 that respectively drive headset right 254 and headset left 258 speakers. Thus, external noise that impinges a headset speaker (and associated feedback microphone) is at least partially cancelled from the negative feedback portion of the amplified audio signal that is, for example, 180 degrees out of phase with the noise that impinges the feedback microphone.

FIG. 3 is a schematic diagram of a headset for an electronic audio device with noise cancellation in accordance with embodiments of the disclosure. Headset 140 includes a headset cord 142 that in various embodiments includes four conductors that are arranged to carry the MIC, HEADSET R, HEADSET L, and GND signals in accordance with the legacy analog interface.

The encoded MIC signal is coupled along headset cord 142 and generated by encoder 290. Encoder 290 is coupled to a feedback microphone right (FBK_MIC_R) 270 and a feedback microphone left (FBK_MIC_L) 280. The feedback microphone right (FBK_MIC_R) 270 and a feedback microphone left (FBK_MIC_L) 280 are arranged facing outwards from the headset 140 to detect external sound (e.g., noise) and covert the external sound to a signal. The headset right (HEADSET R) 254 and headset left (HEADSET L) 258 speakers are arranged facing inwards so that each headset microphone is around 180 degrees out of phase with the associated headset speaker.

In an embodiment, the encoder 290 is arranged in a left side of the headset 140. Conductive wiring for the feedback microphone right (FBK_MIC_R) 270 and headset right (HEADSET R) 254 is routed across a headset 140 headband to couple the feedback right signal to the encoder 290. In another embodiment, the right feedback microphone right (FBK_MIC_R) 270 and headset right (HEADSET R) 254 are arranged in an "earbud" (not shown) that is supported by the right pinna and/or external ear canal and are coupled to the feedback microphone left (FBK_MIC_L) 280 and the headset left (HEADSET L) 258 speaker that are supported by the left pinna and/or external ear canal. In yet another embodiment, the headset 140 is a monaural system and, for example, only uses a feedback microphone and speaker on a left side of the user.

Headset 140 optionally includes microphone 260 that, when present, that is arranged to generate the MIC signal in response to, for example, speech from the user of headset 140. The generated MIC signal is coupled to the encoder 290. When microphone 260 is present the encoded MIC signal is generated by encoder 290 in response to the MIC signal and the feedback microphone right and left signals. When microphone 260 is not present (and/or coupled to encoder 290) the encoded MIC signal is generated by encoder 290 in response to the MIC signal and the feedback microphone right and left signals.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. An electronic audio device comprising:
    (a) a user interface controller;
    (b) a headset interface having a right audio lead, a left audio lead, and a microphone lead;
    (c) an audio system coupled to the user interface controller and having a right audio output and a left audio output; and
    (d) a decoder including:
        i. a left ultrasonic demodulator having an input connected to the microphone lead and an output;
        ii. a left mixer having an input connected to the left audio output, an input connected to the output of the left ultrasonic demodulator, and an output connected to the left audio lead;
        iii. a right ultrasonic demodulator having an input connected to the microphone lead and an output; and
        iv. a right mixer having an input connected to the right audio output, an input connected to the output of the right ultrasonic demodulator, and an output connected to the right audio lead.

2. The electronic audio device of claim 1 in which the audio system includes a microphone input and including a low pass filter having an input connected to the microphone lead and an output connected to the microphone input.

3. The electronic audio device of claim 1 including a processing unit coupled to the audio system and the user interface controller.

4. The electronic audio device of claim 1 including a memory coupled to the audio system and a processing unit coupled to the memory and the audio system.

5. The electronic audio device of claim 1 in which the left mixer has a non-inverting input connected to the left audio output, an inverting input connected to the output of the left ultrasonic demodulator, and an output connected to the left audio lead.

6. The electronic audio device of claim 1 in which the right mixer has a non-inverting input connected to the right audio output, an inverting input connected to the output of the right ultrasonic demodulator, and an output connected to the left audio lead.

* * * * *